US012467366B2

(12) United States Patent
Morton et al.

(10) Patent No.: US 12,467,366 B2
(45) Date of Patent: Nov. 11, 2025

(54) TURBINE ENGINE WITH A NOZZLE HAVING COOLING FEATURES

(71) Applicant: General Electric Company, Evendale, OH (US)

(72) Inventors: Nancy Haviland Morton, Cincinnati, OH (US); Harjit S. Hura, Cincinnati, OH (US); Alison E. Schulte, Ortonville, MI (US); Michael David Gervasio, Cincinnati, OH (US); Daniel Osgood, Loveland, OH (US); Marie Myers, Cincinnati, OH (US); Brett A. Rich, Crestview Hills, KY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/962,252

(22) Filed: Nov. 27, 2024

(65) Prior Publication Data

US 2025/0179922 A1 Jun. 5, 2025

Related U.S. Application Data

(60) Provisional application No. 63/605,323, filed on Dec. 1, 2023, provisional application No. 63/605,164, filed on Dec. 1, 2023.

(51) Int. Cl.
| | | |
|---|---|---|
| F01D 5/00 | (2006.01) | |
| F01D 5/14 | (2006.01) | |
| F01D 5/18 | (2006.01) | |
| F02C 7/18 | (2006.01) | |

(52) U.S. Cl.
CPC .............. *F01D 5/18* (2013.01); *F01D 5/143* (2013.01); *F02C 7/18* (2013.01)

(58) Field of Classification Search
CPC ................................. F01D 5/143; F01D 5/18
See application file for complete search history.

(56) References Cited

U.S. PATENT DOCUMENTS

| | | | | |
|---|---|---|---|---|
| 4,420,288 | A * | 12/1983 | Bischoff | F01D 5/145 415/914 |
| 6,077,036 | A * | 6/2000 | Heffron | F01D 5/288 415/115 |
| 6,095,755 | A | 8/2000 | Houston | |
| 6,382,906 | B1 * | 5/2002 | Brassfield | F01D 5/187 415/115 |

(Continued)

FOREIGN PATENT DOCUMENTS

| | | |
|---|---|---|
| EP | 1039096 A2 | 9/2000 |
| FR | 3127024 | 3/2023 |

(Continued)

*Primary Examiner* — Katheryn A Malatek
(74) *Attorney, Agent, or Firm* — Hanley, Flight & Zimmerman, LLC

(57) ABSTRACT

A turbine engine includes an engine core extending along an engine centerline and includes a compressor section, a combustor, and a turbine section in serial flow arrangement. A turbine nozzle is arranged in the turbine section. Vanes of the turbine nozzle include a vane airfoil having cooling features formed in a trailing edge of the vane airfoil. Vanes of the turbine nozzle further include a baffle insert in a cavity of the vane airfoil. The baffle insert includes cooling holes.

7 Claims, 8 Drawing Sheets

(56) References Cited

U.S. PATENT DOCUMENTS

| | | | |
|---|---|---|---|
| 6,932,568 B2* | 8/2005 | Powis | F01D 25/246 |
| | | | 415/209.2 |
| 7,008,185 B2* | 3/2006 | Peterman | F01D 5/189 |
| | | | 415/115 |
| 7,775,769 B1 | 8/2010 | Liang | |
| 8,021,113 B2 | 9/2011 | Routier | |
| 8,408,872 B2 | 4/2013 | Briggs | |
| 8,684,684 B2 | 4/2014 | Clements | |
| 8,876,989 B2 | 11/2014 | O'Hara | |
| 9,506,351 B2 | 11/2016 | Bubnick | |
| 9,957,816 B2 | 5/2018 | Bunker | |
| 10,690,055 B2 | 6/2020 | Stover | |
| 11,220,916 B2 | 1/2022 | Snider | |
| 11,306,617 B2 | 4/2022 | Gallier | |
| 2011/0116912 A1 | 5/2011 | Mccall | |
| 2016/0290645 A1* | 10/2016 | Carr | F23R 3/002 |
| 2017/0218769 A1* | 8/2017 | Venugopal | F01D 5/145 |
| 2018/0111200 A1 | 4/2018 | Bunker | |
| 2018/0135426 A1 | 5/2018 | Barker et al. | |
| 2018/0209337 A1 | 7/2018 | Russo | |
| 2018/0347442 A1 | 12/2018 | Lacy | |
| 2022/0341339 A1 | 10/2022 | Frey | |
| 2023/0016532 A1 | 1/2023 | Cho | |
| 2023/0407752 A1* | 12/2023 | Okamoto | F01D 5/187 |

FOREIGN PATENT DOCUMENTS

| | | |
|---|---|---|
| FR | 3127025 | 3/2023 |
| FR | 3127269 | 3/2023 |
| FR | 3129375 | 5/2023 |
| FR | 3129428 | 5/2023 |
| FR | 3129432 | 5/2023 |
| FR | 3129436 | 5/2023 |
| FR | 3129690 | 6/2023 |
| FR | 3129970 | 6/2023 |
| FR | 3129972 | 6/2023 |
| FR | 3130313 | 6/2023 |
| FR | 3130323 | 6/2023 |
| FR | 3130747 | 6/2023 |
| FR | 3130874 | 6/2023 |
| FR | 3130875 | 6/2023 |
| FR | 3130877 | 6/2023 |
| FR | 3130879 | 6/2023 |
| FR | 3130894 | 6/2023 |
| FR | 3130895 | 6/2023 |
| FR | 3130896 | 6/2023 |
| FR | 3130897 | 6/2023 |
| FR | 3132279 | 8/2023 |
| FR | 3132729 | 8/2023 |
| FR | 3132743 | 8/2023 |
| FR | 3133367 | 9/2023 |
| FR | 3133368 | 9/2023 |

* cited by examiner

TURBINE ENGINE WITH A NOZZLE HAVING COOLING FEATURES

CROSS REFERENCE TO RELATED APPLICATIONS

This application claims the benefit of U.S. Provisional Patent Application Number 63/605,164, filed Dec. 1, 2023, and U.S. Provisional Patent Application No. 63/605,323, filed Dec. 1, 2023, which are all incorporated by reference herein in their entireties.

FIELD

The present subject matter relates generally to turbine engines, and more particularly, to nozzle assemblies of turbine engines.

BACKGROUND

A gas turbine engine typically includes an engine core. The engine core generally includes, in serial flow order, a compressor section, a combustion section, a turbine section, and an exhaust section. In operation, air is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section. The flow is then routed through the exhaust section, e.g., to atmosphere.

The combustion section includes a combustor having a combustion chamber. Downstream of the combustor chamber, the turbine section includes one or more stages. Each stage may include a plurality of stationary nozzle airfoils as well as a plurality of blade airfoils attached to a rotor. The rotor is driven by the flow of combustion gases against the blade airfoils.

During operation of the gas turbine engine, various systems generate a relatively large amount of heat and stress. For example, a substantial amount of heat and stress can be generated during operation of the thrust generating systems, lubrication systems, electric motors and/or generators, hydraulic systems, or other systems.

BRIEF DESCRIPTION OF THE DRAWINGS

A full and enabling disclosure of the present disclosure, including the best mode thereof, directed to one of ordinary skill in the art, is set forth in the specification, which reference to the appended figures, in which.

Figure 1:
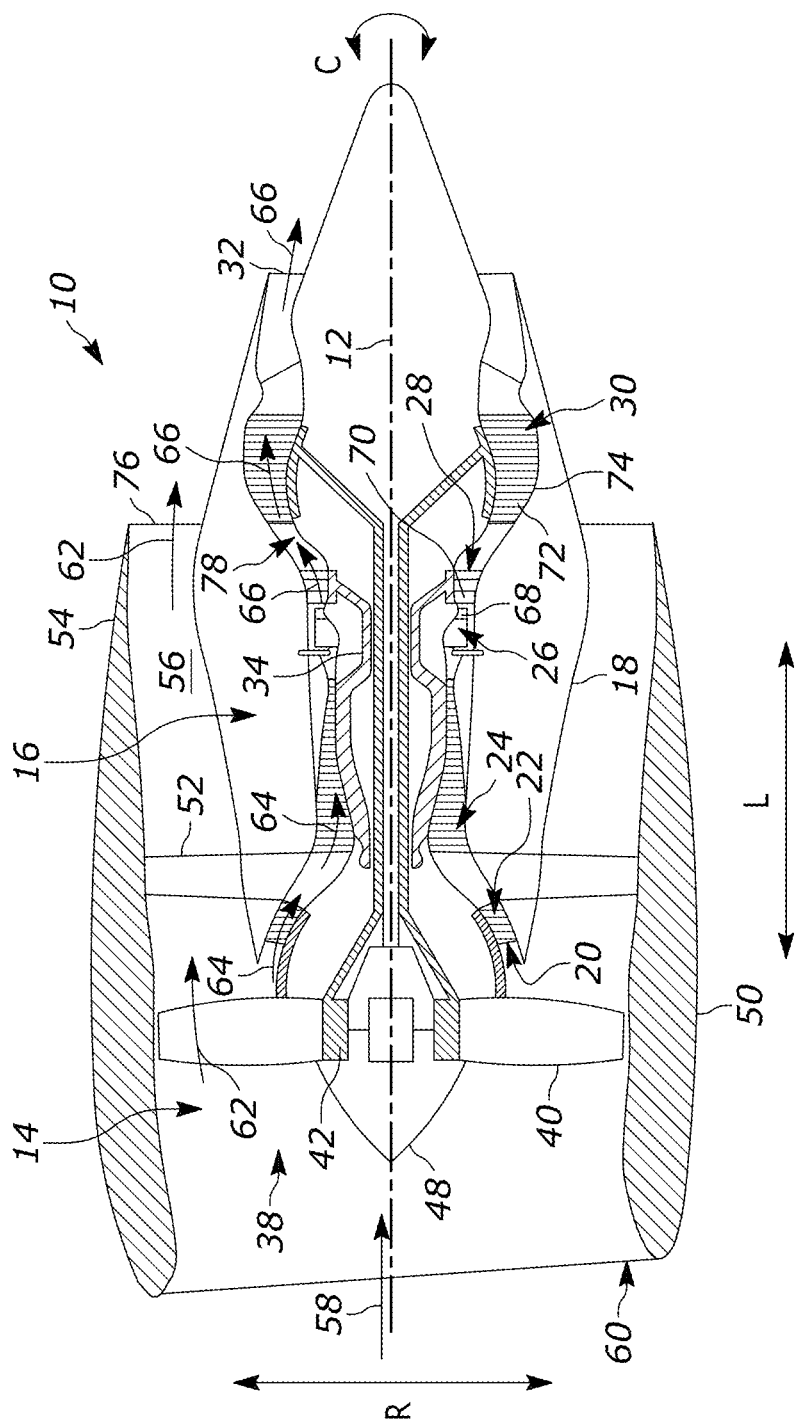
FIG. 1 is a schematic, cross-sectional view of a gas turbine engine in accordance with exemplary aspects of the present disclosure.

Elements in the figures are illustrated for simplicity and clarity and have not necessarily been drawn to scale. For example, the dimensions and/or relative positioning of some of the elements in the figures may be exaggerated relative to other elements to help to improve understanding of variations of the present disclosure. Also, common but well-understood elements that are useful or necessary in a commercially feasible embodiment are often not depicted in order to facilitate a less obstructed view of these variations of the present disclosure. Certain actions and/or steps may be described or depicted in a particular order of occurrence while those skilled in the art will understand that such specificity with respect to sequence is not actually required.

DETAILED DESCRIPTION

Reference will now be made in detail to embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

A "set" or a set of elements as used herein can include any number of elements, including one.

The terms "axial" and/or "axially" refer to the relative position along a longitudinal axis (L) of an engine.

The terms "radial" or "radially" refer to a direction (R) away from a common center. For example, in the overall context of a turbine engine, radial refers to a direction along a ray extending between a center longitudinal axis of the engine and an outer engine circumference.

The term "exhaust gas temperature" (denoted EGT) refers to a gas temperature in a turbine engine. As used herein, EGT is a "redline exhaust gas temperature," which refers to a maximum permitted takeoff temperature documented in a Federal Aviation Administration ("FAA")-type certificate data sheet. For example, in certain exemplary embodiments, the term redline exhaust gas temperature EGT refers to a maximum permitted takeoff that the engine is rated to withstand. EGT is a temperature of an airflow measured downstream of a first stage stator of an HP turbine of an engine. In embodiments wherein the engine is configured as a three-spool engine, EGT is measured downstream of the last stage of rotor blades of an intermediate speed turbine. The term redline exhaust temperature EGT is sometimes also referred to as an indicated turbine exhaust gas temperature or indicated turbine temperature.

The term "core speed" (denoted CORE Speed) refers to the rotational speed at which the high-pressure compressor and the high-pressure turbine rotate about a rotational axis.

The high-pressure turbine and the high-pressure compressor are rotationally connected. As used herein, CORE Speed is a "redline core speed," which refers to a maximum rotational speed of the turbine engine permitted at takeoff as documented in the FAA-type certificate data sheet. For example, the redline core speed is the maximum rate at which the drive shaft for the turbine engine rotates, which defines the maximum rotational speed of a particular blade within the engine.

The term "total slot flow area" (denoted SFA) refers to the sum of flow areas of slots formed in the trailing edge surface of a vane airfoil.

The term "total cooling hole area" (denoted CHA) refers to the sum of flow areas of cooling holes formed in a baffle insert.

The singular forms "a", "an", and "the" include plural references unless the context clearly dictates otherwise.

As used herein, a "stage" of either the compressor or turbine is a set of blades and an adjacent set of nozzle vanes (also referred to as "vanes").

The blades and vanes are circumferentially arranged about an engine centerline. In one implementation, the blades are mounted to a rotating structure, such as a disk, to effect rotation about the engine centerline. The vanes are stationary and mounted to a casing that surrounds the blades. In another implementation, such as with a counter-rotating engine, the vanes are mounted to a rotating drum that surrounds the blades and rotates about the engine centerline.

A "nozzle set" is an annular ring of vanes arranged axially adjacent a set of blades to direct the flow of combustion gases through the turbine engine. A "nozzle segment" refers to at least two circumferentially-adjacent vanes of the annular nozzle set. As illustrated, a nozzle segment may include two individual vanes—a leading vane and a trailing vane. Individual nozzle segments are combined to form the annular nozzle.

As used herein, the term "stress" refers to the internal force balance within a material that produces strain or deformation of a part subjected to internal (inertial, thermal) or external forces (point or pressure loading).

Connection references (e.g., attached, coupled, connected, and joined) are to be construed broadly and can include intermediate structural elements between a collection of elements and relative movement between elements unless otherwise indicated. As such, connection references do not necessarily infer those two elements are directly connected and in fixed relation to one another. The exemplary drawings are for purposes of illustration only. The dimensions, positions, order, and relative sizes of elements reflected in the drawings attached hereto can vary.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values, and/or endpoints defining range(s) of values. Here and throughout the specification and claims, range limitations include all the sub-ranges contained therein unless context or language indicates otherwise. For example, all ranges disclosed herein are inclusive of the endpoints.

Gas turbine engines that are designed to operate at certain temperatures and speeds can cause turbine nozzles to encounter stresses at certain locations that limit the life of a turbine nozzle. It is desirable to have turbine nozzles that limit stresses at certain locations under certain operating conditions. Undesirable stresses may be due to temperature gradient and/or non-uniformity of airfoil loads (e.g., mechanical or thermal loads). For instance, given the environment within a gas turbine engine certain portions of a nozzle's vane can experience heating at a much higher amount than other portions of the same vane. This thermal gradient stresses the structure of the vane making it less able to, over time, withstand many of the other physical stresses the vane may experience.

It is also desirable to have turbine nozzles that limit stresses in each vane of a nozzle segment. For example, as compared to the leading vane, the trailing vane may exhibit significantly higher stresses that limit the life of the turbine nozzle.

One approach for solving the problem of improving nozzle assembly durability has been to utilize stronger materials to combat local stresses. However, such materials lead to increased costs, system weight, and overall space occupied by the nozzles. The overall engine efficiency may in turn be reduced, and related components may have to be redesigned to compensate for the stronger materials. In some cases, the cost of this approach outweighs the benefit. Therefore, a solution with a greater benefit for systems that are used in existing engines is needed, without requiring redesign of related components.

Another approach for combatting mechanically- and thermally-driven stresses is to increase the size of the nozzle assembly. However, this too can lead to increased costs, increased system weight, increased overall space occupied by the nozzle assembly, and performance loss.

Nozzle assemblies are typically evaluated according to a size, type, etc. that satisfies three key requirements: sizing to existing engine systems, acceptable stress levels, and acceptable stress load paths. This is a labor and time intensive process because the process is iterative and involves the selection of particular dimensions designed for operating within current engine systems, determining the stresses associated with particular iterations, and evaluating whether these stresses are limited during operating cycles.

The inventors have sought to improve upon current nozzle assembly design to reduce the aforementioned stresses and improve engine performance. In doing so, the inventors have found that cooling features in certain locations of the vanes of a turbine nozzle limit local stresses in the vanes for certain engine systems. These locations include a trailing edge of an airfoil of a vane and an insert or baffle disposed within the airfoil of the vane. More particularly, the inventors have found that cooling geometries (e.g., in the form of trailing edge slots or holes) in the trailing edge of a vane, in combination with cooling geometries of a baffle disposed within the airfoil, allow for the improvement of allocated cooling air, producing a more robust and durable nozzle assembly. As discussed herein, improvements to the trailing edge are provided through the inclusion of more robust trailing edge cooling geometries, and improvements to the airfoil vane panels are provided through the inclusion of updated backside cooling.

These and other features, aspects, and advantages of the present disclosure will become better understood with reference to the following description and appended claims.

The accompanying drawings, which are incorporated in and constitute a part of this specification, illustrate embodiments of the disclosure and, together with the description, serve to explain the principles of the disclosure.

Referring now to the drawings, FIG. 1 provides a schematic cross-sectional view of a turbine engine 10, which may be a gas turbine engine, in accordance with an exemplary embodiment of the present disclosure. As shown in FIG. 1, the turbine engine 10 defines an axial direction A (extending parallel to a longitudinal or axial centerline 12 provided for reference) and a radial direction R. A circumferential direction C extends three hundred sixty degrees (360°) around the axial centerline 12.

The turbine engine 10 includes a fan section 14 and a core turbine engine or engine core 16 disposed downstream of the fan section 14. The exemplary engine core 16 depicted generally includes a substantially tubular outer casing 18 that defines an annular core inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and an exhaust nozzle section 32.

A high pressure (HP) shaft or spool 34 drivingly connects the HP turbine 28 to the HP compressor 24. A low pressure (LP) shaft or spool 36 drivingly connects the LP turbine 30 to the LP compressor 22. In other embodiments of turbine engine 10, additional spools may be provided.

The fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by the LP shaft 36. In some embodiments, a power gear box having a plurality of gears can be included for stepping down the rotational speed of the LP shaft 36 to a more efficient rotational fan speed.

Referring still to the exemplary embodiment of FIG. 1, disk 42 is covered by rotatable spinner 48. The rotatable spinner 48 is aerodynamically contoured to promote an airflow through the plurality of fan blades 40.

The exemplary fan section 14 includes an annular fan casing or outer nacelle 50 that circumferentially surrounds the fan 38 and/or at least a portion of the engine core 16. The nacelle 50 is supported relative to the engine core 16 by a plurality of circumferentially-spaced outlet guide vanes 52. Moreover, a downstream section 54 of the nacelle 50 can extend over an outer portion of the engine core 16 so as to define a bypass airflow passage 56 therebetween as shown in FIG. 1.

During operation of the turbine engine 10, a volume of air 58 enters turbine engine 10 through an associated inlet 60 of the nacelle 50 and/or fan section 14. A first portion of the air 58 (as indicated by arrows 62) is directed or routed into the bypass airflow passage 56 and a second portion of the air 58 (as indicated by arrows 64) is directed or routed into the LP compressor 22. The ratio between the first portion of air 62 and the second portion of air 64 is commonly known as a bypass ratio. The pressure of the second portion of air 64 is increased as it is routed through the high pressure (HP) compressor 24 and into the combustion section 26, where it is mixed with fuel and burned to provide combustion gases 66.

The combustion gases 66 are routed through the HP turbine 28. In the HP turbine 28, a portion of thermal and/or kinetic energy from the combustion gases 66 is extracted via passage through sequential stages of HP turbine stator vanes 68 and HP turbine rotor blades 70 that are coupled to the HP shaft or spool 34. The energy that is extracted causes the HP shaft or spool 34 to rotate and supports operation of the HP compressor 24.

The combustion gases 66 are then routed through the LP turbine 30. In the LP turbine 30, a second portion of thermal and kinetic energy is extracted from the combustion gases 66 via passage through sequential stages of LP turbine stator vanes 72 and LP turbine rotor blades 74 that are coupled to the LP shaft or spool 36. The energy that is extracted causes the LP shaft or spool 36 to rotate and supports operation of the LP compressor 22 and/or rotation of the fan 38.

The combustion gases 66 are subsequently routed through the exhaust nozzle section 32 of the engine core 16 to provide propulsive thrust. The HP turbine 28, the LP turbine 30, and the exhaust nozzle section 32 at least partially define a hot gas path 78 for routing the combustion gases 66 through the engine core 16.

Simultaneously, the pressure of the first portion of air 62 is substantially increased and also provides propulsive thrust. The pressure of the first portion of air 62 is increased as it is routed through the bypass airflow passage 56 before it is exhausted from a fan nozzle exhaust section 76 of the turbine engine 10.

It should be appreciated that the turbine engine 10 depicted in FIG. 1 is by way of example only. In other exemplary embodiments, the turbine engine 10 may have other suitable configurations. For example, in other exemplary embodiments, the turbine engine 10 may include additional components (e.g., any other suitable number of shafts or spools), and/or may exclude depicted components (e.g., fan 40). Accordingly, it will be appreciated that in other exemplary embodiments, the turbine engine 10 may be configured as various suitable turbomachines, e.g., a turbojet engine, a turboshaft engine, a turboprop engine, etc., and further may be configured as an aeroderivative gas turbine engine or industrial gas turbine engine.

Figure 2:
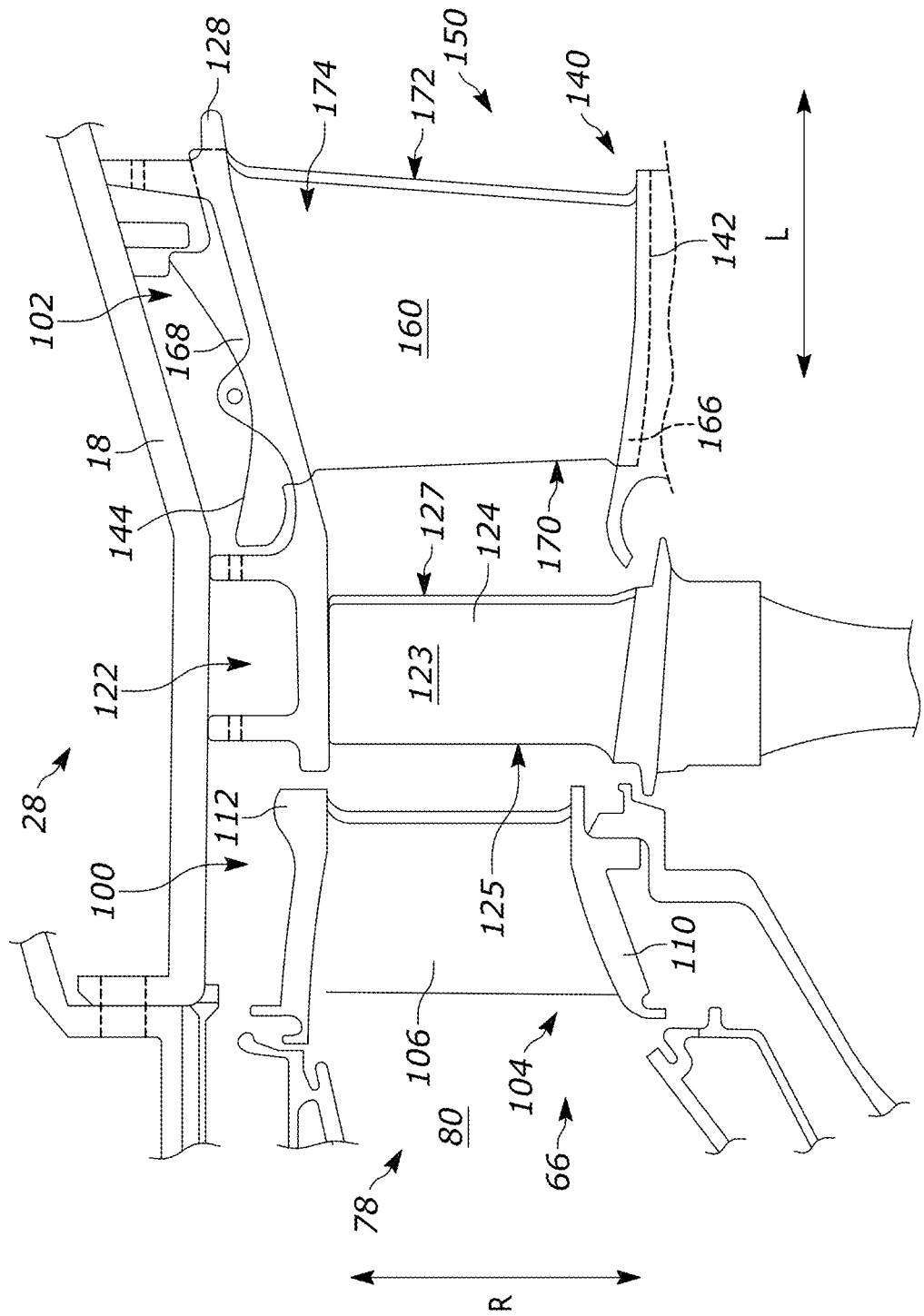
FIG. 2 is a close-up, side view of a portion of a turbine section of the gas turbine engine of FIG. 1.

Referring now to FIG. 2, a schematic view is provided of the HP turbine 28 of the turbine section of the engine core 16, which is located downstream from combustion section 26. The combustion section 26 generally includes a combustor defining a combustion chamber 80. A mixture of fuel and air is combusted within the combustion chamber 80 to generate a flow of combustion gases (combustion gases 66 of FIG. 1) therethrough. Downstream of the combustion section 26, the HP turbine 28 includes a plurality of turbine component stages. Each turbine component stage comprises a plurality of turbine components that define and/or are positioned within the hot gas path 78 through which the combustion gases flow.

More particularly, for the embodiment depicted in FIG. 2, HP turbine 28 includes a plurality of turbine nozzle stages, as well as one or more stages of turbine rotor blades. Specifically, the HP turbine 28 includes a first stage turbine nozzle 100 and a second stage turbine nozzle 102, each configured to direct a flow of combustion gases 66 therethrough.

The first stage turbine nozzle 100 is located immediately downstream from the combustion section 26, and thus may also be referred to as a combustor discharge nozzle stage. The first stage turbine nozzle 100 includes a plurality of first stage turbine nozzle segments 104 (e.g., combustion discharge nozzle segments) spaced along the circumferential direction C. Each first stage turbine nozzle segment 104 includes a first stage airfoil 106 positioned within the hot gas path 78.

Each first stage turbine nozzle segment 104 further includes an inner band segment 110 defining an inner wall of the first stage turbine nozzle segment 104 and an outer band segment 112 defining an outer wall of the first stage turbine nozzle segment 104. The first stage airfoils 106 extend generally along the radial direction R from the inner band segment 110 to the outer band segment 112. Together, the plurality of first stage turbine nozzle segments 104 define the first stage turbine nozzle 100.

Located immediately downstream of the first stage turbine nozzle 100 and immediately upstream of the second stage turbine nozzle 102, the HP turbine 28 includes a first stage turbine rotor 122 including turbine rotor blades 124. Each turbine rotor blade 124 has an airfoil 123 extending axially between a leading edge 125 and a trailing edge 127. The first stage turbine rotor 122 is, in turn, connected to the HP shaft 34 (see FIG. 1). As such, the turbine rotor blades 124 are configured to extract kinetic energy from the flow of combustion gases through the hot gas path 78 defined by the HP turbine 28 as rotational energy applied to the HP shaft 34.

Figure 3:
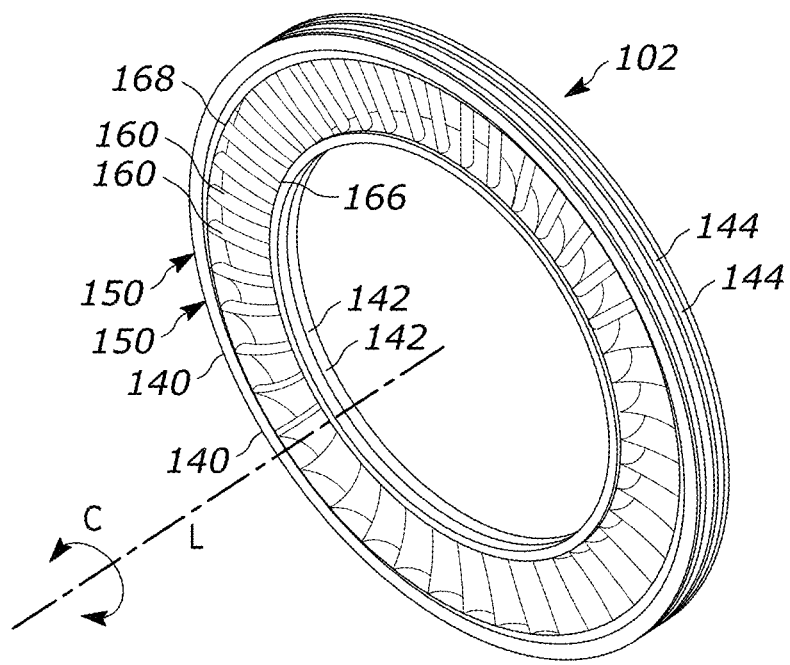
FIG. 3 is a perspective view of a turbine nozzle of the gas turbine engine of FIG. 1.

Referring to FIGS. 2 and 3, the second stage turbine nozzle 102 includes a plurality of second stage turbine nozzle segments 140 spaced along the circumferential direction C and positioned within the hot gas path 78. Each second stage nozzle segment 140 includes at least one vane 150. Each vane 150 includes an inner band segment 142 defining an inner wall of the vane 150, an outer band segment 144 defining an outer wall of the vane 150, and a vane airfoil 160 (also referred to herein as an "airfoil"). Multiple vanes 150 are joined or otherwise connected to form a second stage turbine nozzle segments 140. Second stage turbine nozzle segments 140 are in turn joined or otherwise connected to form the annular second stage turbine nozzle 102. In this way, the individual vanes 150 form continuous inner and outer walls (including the inner and outer band segments 142 and 144, respectively) of the second stage turbine nozzle 102, with vane airfoils 160 extending between the inner and outer walls.

Each vane airfoil 160 has an outer surface 174 defining a leading edge 170 and a trailing edge 172. The outer surface 174 delimits an internal cavity 184 for the vane airfoil 160. The leading edge 170 is forward (with respect to the longitudinal axis) or upstream (with respect to flow across the airfoil) of trailing edge 172. Each vane airfoil 160 further includes a radially inner nozzle end 166 proximate the inner band segment 142 and that is a first distance from the longitudinal axis, and a radially outer nozzle end 168 proximate the outer band segment 144 and that is a second distance from the longitudinal axis that is greater than the first distance.

Figure 4:
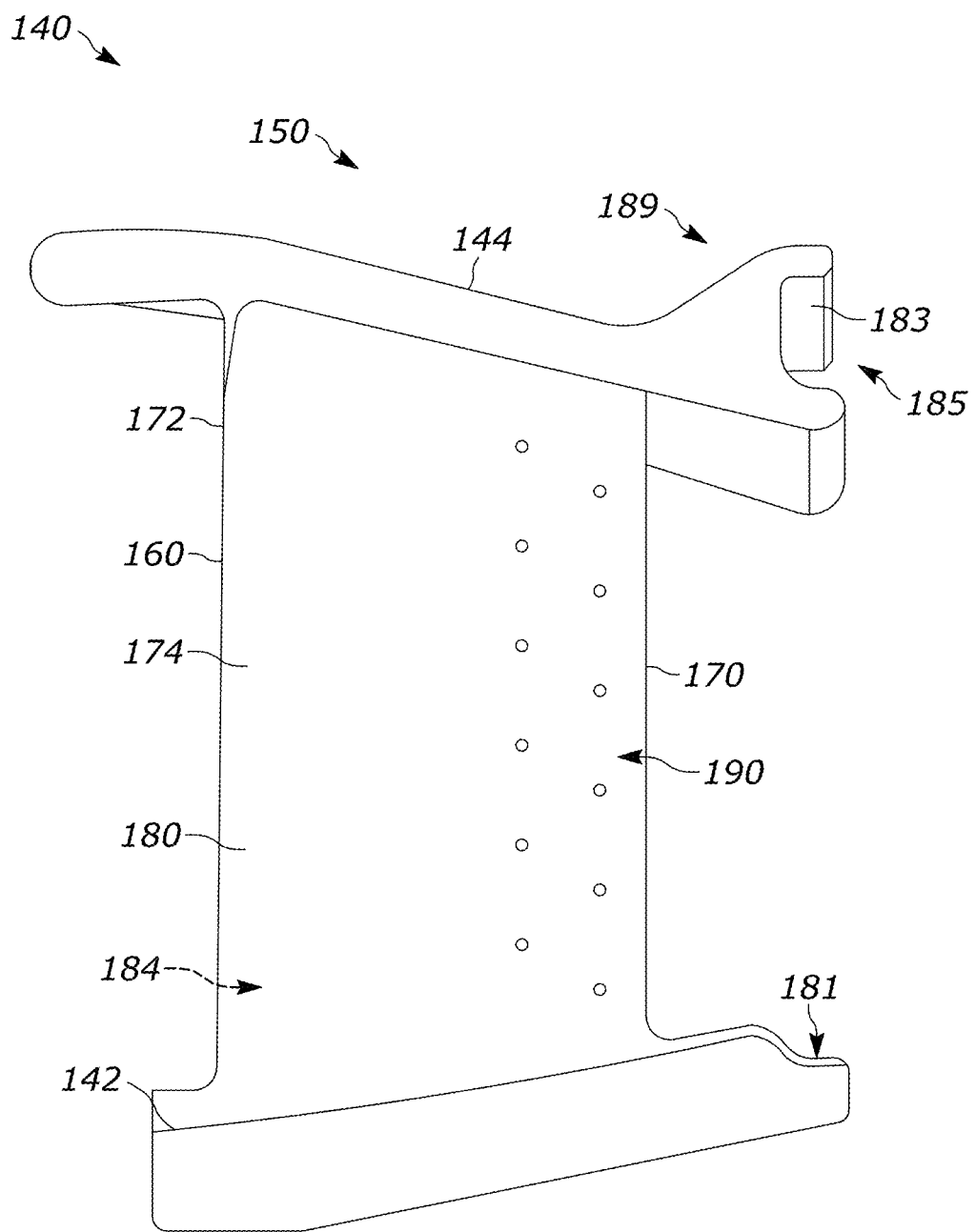
FIG. 4 is a side elevation view of an exemplary nozzle segment.
Figure 5:
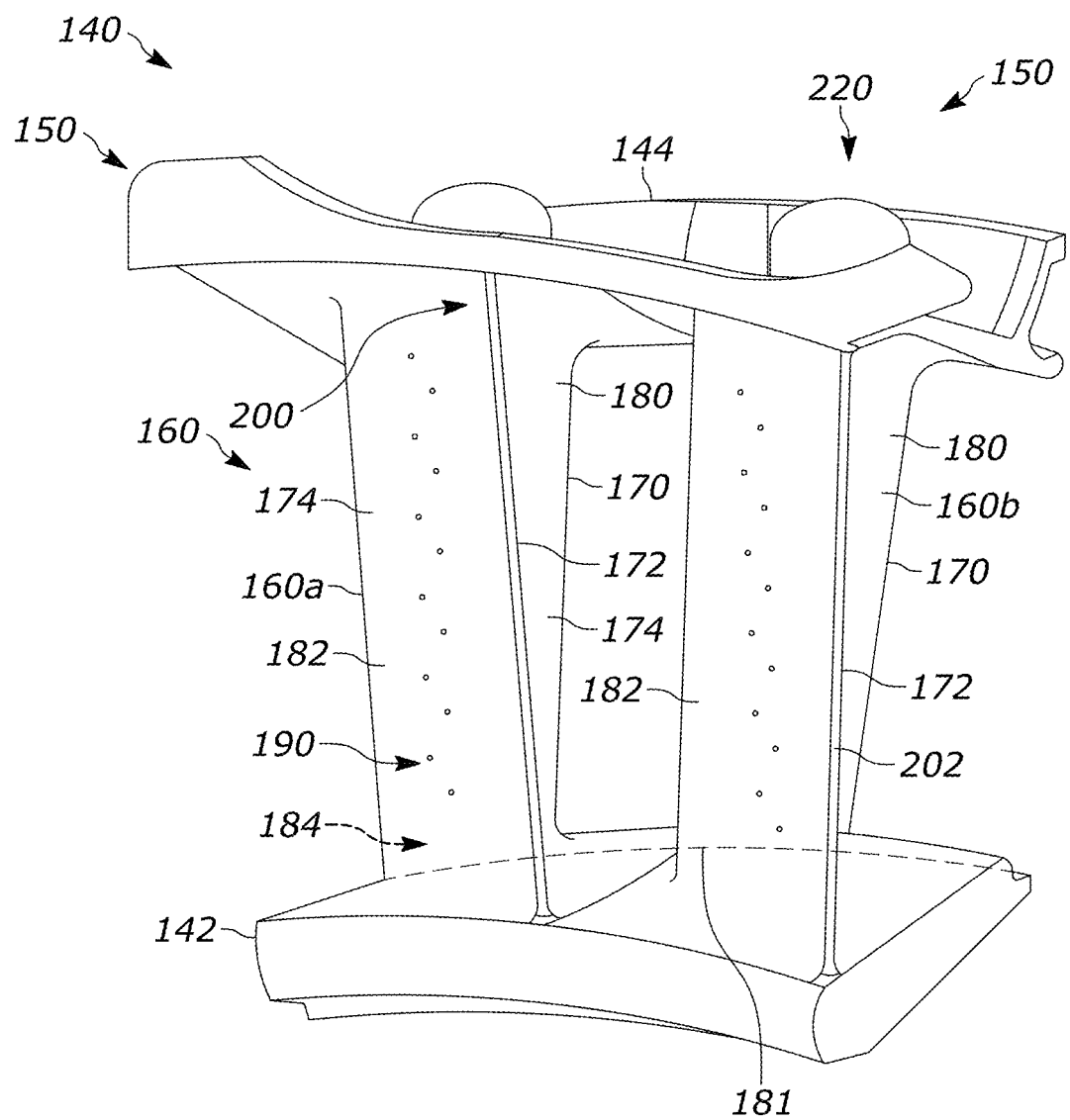
FIG. 5 is a rear perspective view of the exemplary nozzle segment of FIG. 4.

FIGS. 4 and 5 show an individual nozzle segment 140. The nozzle segment 140 includes one or more vanes 150, each having a vane airfoil 160. As shown in FIG. 5, the nozzle segment 140 may include two vanes 150. The vanes 150 of a nozzle segment 140 may have different vane airfoil 160 configurations, illustrated, for example, as a first vane airfoil 160a and a second vane airfoil 160b. It is to be appreciated that the teachings described herein are also applicable to a nozzle segment 140 having a single vane 150 or three or more vanes 150.

In the examples of FIG. 4 and FIG. 5, a nozzle inner band radius (IBR) 181 is defined by an arc along the indicated surface, i.e., circumferentially along a portion of the inner band segment 142, which portion is in the upstream direction. Due to this component's stationary operational characteristics, the primary drivers of the stress experienced by the component are flow path forces and thermal interactions. The height of the inner band radius 181 is the minimum radius at which hot gases from the upstream components enter the second stage turbine nozzle 102. This interface primarily assists in controlling hot gas ingestion and cooling usage to cool components. The alignment of the interface with the upstream components drives a loading response on the nozzle 102. Stress experienced by the nozzle 102 is created through thermal and mechanical mechanisms, both influencing and impacting component durability and component lifetime.

Figure 9:
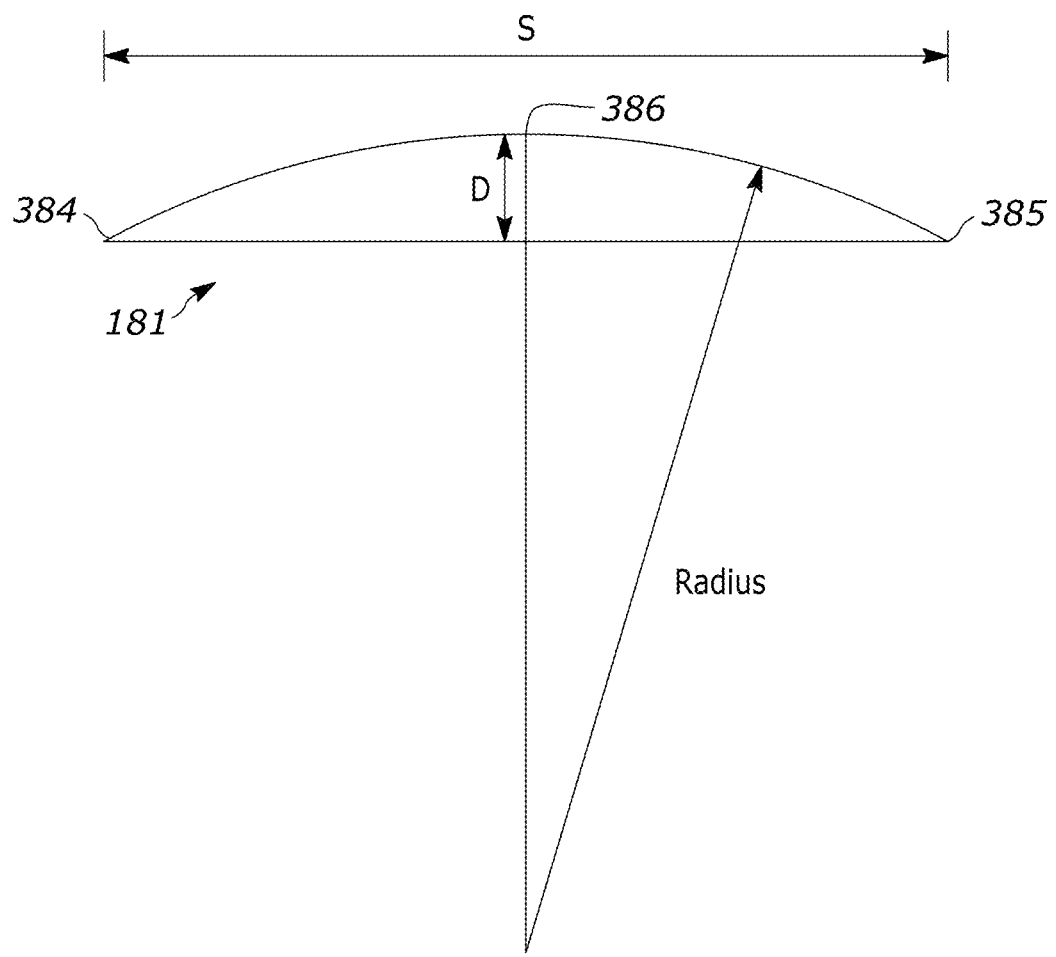
FIG. 9 is a representation of an arc along a portion of a nozzle segment of FIG. 4.

With reference to FIG. 9, the inner band radius 181 is determined by using three points: two end points 384, 385 of the arc of the inner band radius 181 to define the width S (chord length) of the arc and the mid-point 386 of the arc to the line used to characterize width (chord length) is the height D (rise). From the height D and width S, the radius of the arc can be derived using known methods. This calculation results in the same value when performed on two vanes or a single vane, for the purpose of this disclosure it is assumed to be performed across two vanes.

Referring again to FIGS. 4 and 5, a nozzle loading area 183 is also described and defined. The nozzle loading area 183 is located on a tab 185 of the outer band segment 144. The outer band segment 144 includes a mounting flange 189. In aspects, the nozzle loading area 183 is a flat surface that mates or attaches to a corresponding surface in an adjacent nozzle segment 140. The nozzle loading area 183 is located at the underside of the forward mounting flange 189.

The nozzle loading area 183 controls the component loading and response. During operation, stresses are imparted onto adjacent nozzle segments 140 and these stresses impact the durability, condition, and lifetime of the nozzle segments 140. The nozzle loading area 183 is a surface having an area across which load is transferred when the nozzle segments 140 are both in-use and not in-use. The load transfer across this surface results in a stress response in the nozzle 102 and contributes to the overall part design and durability.

The nozzle loading area 183 is calculated for a single vane and determined by first calculating the length of the radius 181 as described above. Then, the length of the loading region is measured by any suitable means. It will be appreciated that this measured length does not include the chamfered or radiused section on the mounting flange 189. The nozzle loading area 183 is equal to the length of loading region multiplied by the length of arc.

The vanes will be described with respect to the embodiments of FIGS. 4 and 5, but it will be understood that other vane designs can be used. As described, individual ones of the vane airfoils 160 of FIGS. 4 and 5 define a leading edge 170 and an opposite trailing edge 172. The outer surface 174 of a vane airfoil 160 defines a pressure side 180 and a suction side 182 opposite the pressure side 180. Each of the pressure side 180 and suction side 182 is defined between the leading edge 170 and the trailing edge 172. The pressure side 180 and the suction side 182 define a cross-sectional chord-wise airfoil shape. As shown, the pressure side 180 is generally concave, and the suction side 182 is generally convex. As discussed in greater detail below, the outer surface 174 of the vane airfoil 160 forms the internal cavity 184 that is sized to receive a baffle insert 220 therein.

One or both of the pressure side 180 and the suction side 182 may include a plurality of cooling features 190. Hot combustion gas 66 exits the combustor section 26 and impinges upon the airfoil 160. The hot combustion gas 66 is mixed with cooling air passing through the nozzle segment 140. The cooling air passes outwardly through the cooling features 190 in the vane airfoil 160 to form a thermal barrier (also called a cooling film) of relatively cool air around the vane airfoil 160.

The trailing edge 172 may be a blunt edge having an arcuate or generally planar wall or surface 202 that extends between the pressure side 180 and the suction side 182 of the vane airfoil 160. Alternatively, the edge can be cast, machined, or polished depending upon the desired result. The shape could be rounded, elliptical, blunt, or the like. The vane airfoil 160 includes cooling features 190 in the form of apertures in the trailing edge 172. The cooling features 190 may be formed with the vane airfoil 160 (e.g., cast), or may be subsequently formed (e.g., machined) in the trailing edge surface 202 after construction of the vane airfoil 160. As discussed in greater detail below, the sum of the flow areas of the cooling features 190 defines a total slot flow area (SFA) formed in the trailing edge surface 202.

The inventors created various designs with different configurations for the cooling features 190, such as elongated slots (e.g., elliptical or racetrack-shaped slots), circles, rectangles, other geometries, or combinations of geometries. "Racetrack"-shaped slots refer to a slot having a shape with two parallel line segments connected by two rounded end portions.

Figure 6:
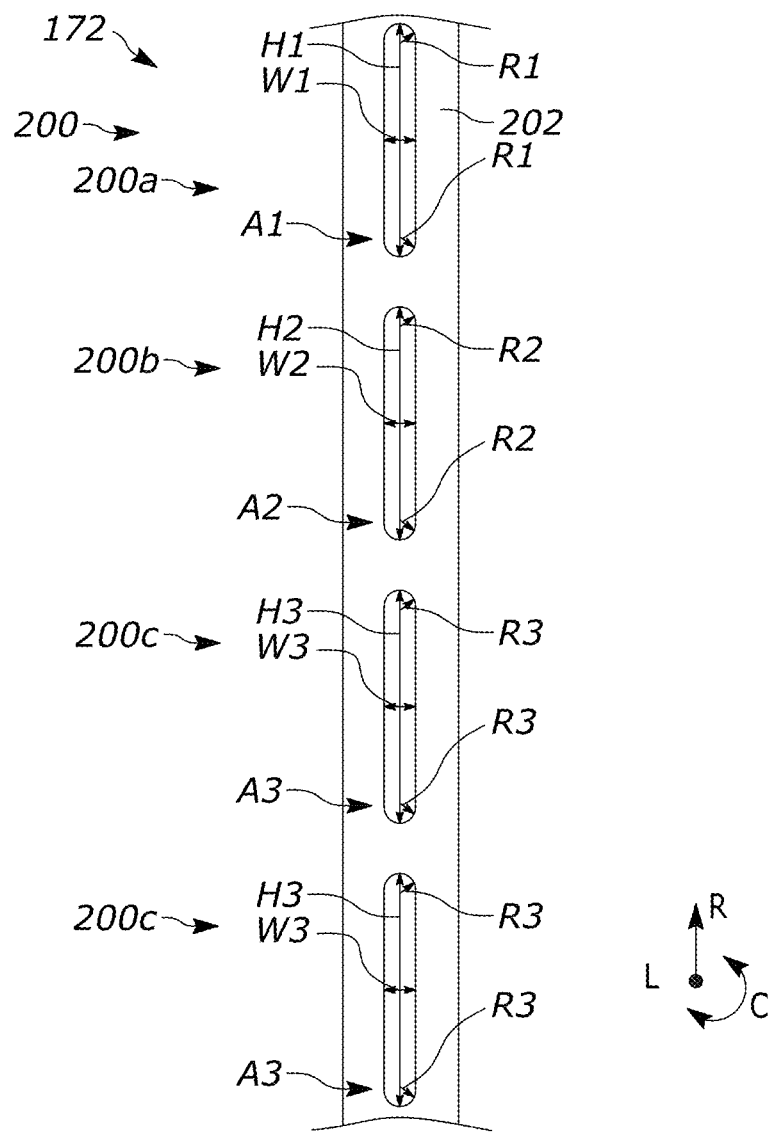
FIG. 6 is an enlarged view of a trailing edge of the exemplary nozzle segment of FIG. 4 showing trailing edge holes.

For example, as shown in FIG. 6, the cooling features 190 may be in the form of slots 200 that each have a height (H) that extends in a generally radial direction, a width (W) that extends in a generally circumferential direction, and end radii (R) at terminal radial ends of the slot 200. The height (H), width (W), and end radii (R) of an individual slot 200 together define a slot flow area of that slot 200.

The slots 200 may differ in individual slot flow areas or may have a common slot flow area. In the illustrated example, the trailing edge 172 includes like first slots 200a (e.g., two first slots 200a), like second slots 200b (e.g., two second slots 200b), and like third slots 200c (e.g., twenty-two third slots 200c). The first slots 200a have a first height (H1), a first width (W1), and a first end radii (R1) that define a first area (A1). The second slots 200b have a second height (H2), a second width (W2), and a second end radii (R2) that define a second area (A2). The multiple third slots 200c have a third height (H3), a third width (W3), and a third end radii (R3) that define a third area (A2). That is to say, the slots 200 may include a first slot (e.g., 200a) having a first geometry, a second slot (e.g., 200b) having a second geometry different than the first slot 200a, and a third slot (200c) having a third geometry different than one or both of the first slot 200a and the second slot 200b.

The total slot flow area (SFA) of the cooling features 190 along the trailing edge 172 is defined by Expression (1):

$$SFA = \sum A_n. \qquad (1)$$

where n=1, 2, 3 . . . . $N_{SFA}$; $N_{SFA}$ is the number of cooling features 190; and $A_n$ is the area of each nth feature and will vary based on the shape of each feature.

For purposes of determining the SFA of the slots 200 described above, area $A_n$ may be expressed as:

$$A_n = (H_n * W_n) - (4R_n - \pi * R_n^2). \qquad (2)$$

In another example, the cooling features 190 may alternatively or additionally include circles having areas according to $A_n = \pi * R_n^2$. The cooling features 190 may also include rectangles having areas according to $A_n = H * W$. In still another example, the cooling features 190 may include ellipses having areas according to $A_n = \pi * a * b$.

Accordingly, the cooling features 190 may be various geometries-including geometries not expressly described herein—as well combinations of various geometries. In the above examples, SFA values range from 0.00001635 m^2 to 0.00005791 m^2 and include various intermediate SFA values. The above intermediate SFA values are merely examples, and other intermediate values are likewise suitable.

Figure 8:
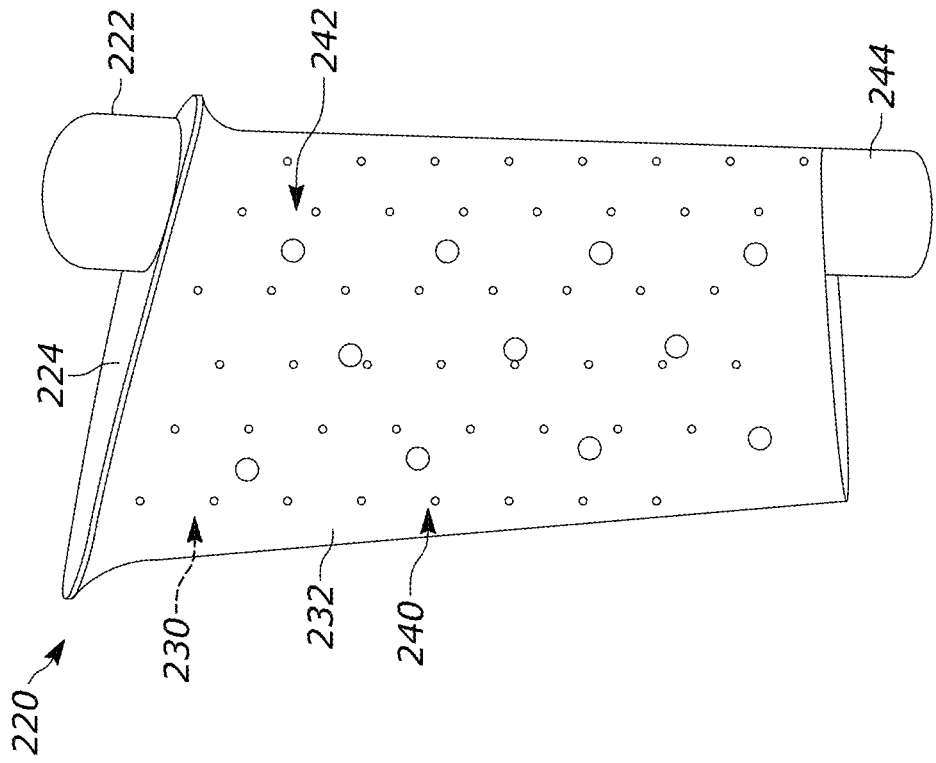
FIG. 8 is a side elevation view of the insert of FIG. 7.
Figure 7:
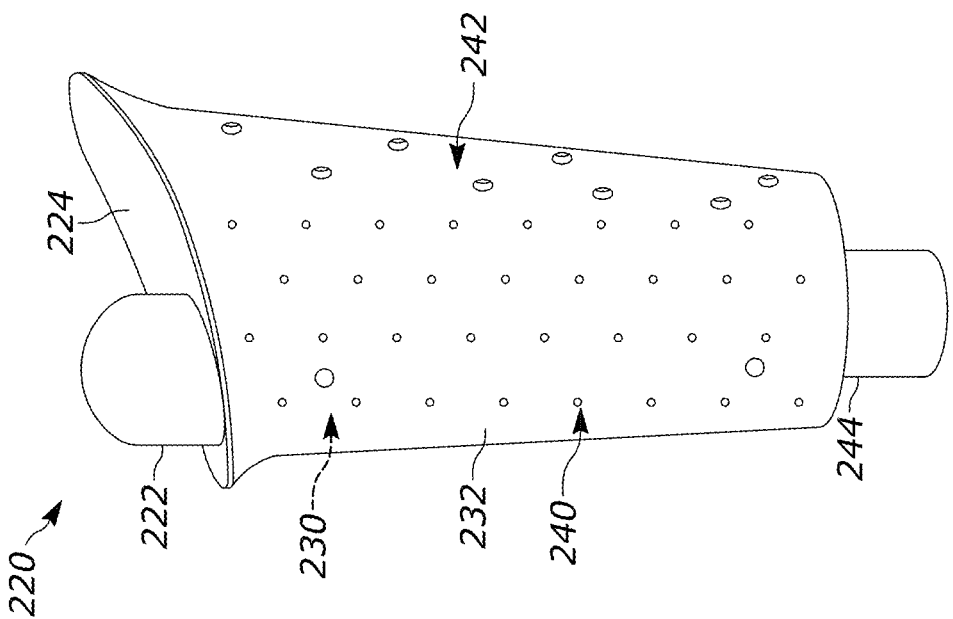
FIG. 7 is a perspective view of an insert for the exemplary nozzle segment of FIG. 4.

Referring now to FIGS. 7 and 8, a baffle insert 220, which may be referred to as an impingement baffle, is shown. The baffle insert 220 is sized to fit in the internal cavity 184 of the vane airfoil 160 of the nozzle segment 140. The baffle insert 220 includes a cooling air inlet 222 in an upper wall 224 of the baffle insert 220. The cooling air inlet 222 receives cooling air and directs the cooling air into an internal cavity 230 defined by upper wall 224 and the baffle wall 232 of the baffle insert 220. Cooling air is then expelled through cooling holes 240 formed in the baffle walls 232 and into the internal cavity 184 of the vane airfoil 160. The cooling air in the internal cavity 184 cools the outer surface 174 of the vane airfoil 160.

The baffle insert 220 may further include one or more features 242 on the baffle walls 232 to space the baffle walls 232 from the outer surface 174 of the vane airfoil 160. The features 242 facilitate airflow through the cooling holes 240 to the internal cavity 184 and outer surface 174. In the example shown, the features 242 are projections. The projections may be formed with the baffle insert 220 (e.g., in the form of dimples), or may be added to the baffle insert 220 after construction (e.g., in the form of stand-off pads). Excess cooling air not expelled through the cooling holes 240 can then be forced or drawn out of an outlet 244 of the baffle insert 220.

The cooling holes 240 each have an individual cooling hole area. The cooling holes 240 may be circular cooling holes, slotted cooling holes, or other suitable geometry. The cooling holes 240, collectively, have a total cooling hole area (CHA) that represents the sum of the cross-sectional areas of the cooling holes 240 that are formed in the baffle insert 220, as defined by Expression (3):

$$CHA = \sum A_m. \qquad (3)$$

Where m=1,2,3 . . . $M_{CHA}$, and "$M_{CHA}$" is the total number of cooling elements formed in the baffle insert 220.

For example, in the case of commonly-dimensioned circular cooling holes 240, the total cooling hole area (CHA) is defined as $A_m$ being equal to $M * \pi * r^2$, where "M" is equal to the total number of commonly-dimensioned cooling holes 240 formed in the baffle insert 220, and "r" is a radius of each of the cooling holes 240. Notwithstanding, Expression (3) contemplates non-commonly-dimensioned cooling holes 240, as well as geometries other than or in addition to circles.

The inventors have found combinations of cooling geometries in a trailing edge of an airfoil vane and cooling geometries in an insert or baffle disposed within the airfoil vane that reduce thermal gradients in these components, which in turn reduces the local stresses in a nozzle operating under such stress-inducing conditions. This was a labor and time intensive process to find a workable solution to problems associated with thermal stress, crack propagation, and crack formation as not all investigated geometries were successful in meeting the goal of limiting these stresses. The process involved careful consideration of the inter-related influences of aerodynamic, thermal, and mechanical factors influencing vane performance (e.g., specific fuel consumption impact). The process also involved assessing durability, ruggedness, and reliability. Reliability includes performing as intended in harsh environments and over a wide range of environmental conditions. Numerous studies were used to evaluate effects on the combined influences of aero performance, thermal, and mechanical strain on a vane. These studies include both analytical and engine testing of vane designs to evaluate the thermal stress profiles of the proposed design. For instance, inventive designs exhibit a more uniform, i.e., less pronounced, thermal gradient in operation. Accordingly, the inventors found that thermal stresses on the various components for the inventive designs fell within acceptable ranges that result in improved overall durability whereas other designs regarding the applicable air flow failed to meet these acceptable ranges.

Using this design practice, the inventors found designs with an improvement in vane durability under defined engine operating conditions. The designs include various geometries of cooling features 190 in the trailing edge 172 of a vane airfoil 160 in combination with various geometries of the cooling holes 240 of a baffle insert 220. In particular, the examples in TABLE 1 (presented below) produce an improved engine that mitigates or reduces local stresses with the corresponding component design metrics.

TABLE 1

| Example | SFA (m^2) | CHA (m^2) | Inner Band Radius (IBR) (m) | Loading Area (per vane) (LA)(m^2) |
|---|---|---|---|---|
| Example 1 | 0.0000160 | 0.0001060 | 0.406 | 0.000209 |
| Example 2 | 0.0000581 | 0.0001940 | 0.411 | 0.000256 |
| Example 3 | 0.0000377 | 0.0001260 | 0.409 | 0.000210 |
| Example 4 | 0.0000548 | 0.0001640 | 0.410 | 0.000239 |
| Example 5 | 0.0000179 | 0.0001190 | 0.407 | 0.000212 |
| Example 6 | 0.0000404 | 0.0001750 | 0.408 | 0.000213 |
| Example 7 | 0.0000254 | 0.0001580 | 0.407 | 0.000232 |
| Example 8 | 0.0000450 | 0.0001400 | 0.410 | 0.000245 |
| Example 9 | 0.0000171 | 0.0001220 | 0.411 | 0.000233 |
| Example 10 | 0.0000204 | 0.0001870 | 0.410 | 0.000224 |

More specifically, the inventors created various designs with different configurations of cooling features having the above described stress profile benefits. These cooling features can be characterized by an Expression (C) that can be used to distinguish those designs in Examples 1-14 that meet the performance (durability) requirements from designs that do not meet the performance requirements. As such, the Expression (C) can be used to identify an improved design. The Expression, referred to herein as (C), is defined as Expression (4):

$$C = 13 * \left(\frac{CHA(m^2) - 0.000103 \text{ m}^2}{0.000103 \text{ m}^2}\right) \left(\frac{SPA(m^2) + 0.00004 \text{ m}^2}{0.00004 \text{ m}^2}\right) \left(\frac{IBR}{0.4}\right) \left(\frac{LA(m^2)}{0.001 \text{ m}^2}\right). \quad (4)$$

Where: IBR is the inner band radius (IBR) as defined above, LA is the loading area (LA) area as defined above, SFA is the total slot flow area (SFA) as defined above, and CHA total cooling hole area (CHA) as defined above.

The inventors have found that values for (C) in the range of between 0.112 and 7.409 inclusive of the endpoints provide for reduction of stresses in the vane airfoil 160, the airfoil 123, and the first stage airfoil 106.

TABLE 2

| Example | SFA (m^2) | CHA (m^2) | Inner Band Radius (IBR) (m) | Loading Area (per vane) (LA)(m^2) | C |
|---|---|---|---|---|---|
| Example 1 | 0.0000160 | 0.0001060 | 0.406 | 0.000209 | 0.112 |
| Example 2 | 0.0000581 | 0.0001940 | 0.411 | 0.000256 | 7.409 |
| Example 3 | 0.0000377 | 0.0001260 | 0.409 | 0.000210 | 0.682 |
| Example 4 | 0.0000548 | 0.0001640 | 0.410 | 0.000239 | 2.144 |
| Example 5 | 0.0000179 | 0.0001190 | 0.407 | 0.000212 | 0.454 |
| Example 6 | 0.0000404 | 0.0001750 | 0.408 | 0.000213 | 2.174 |
| Example 7 | 0.0000254 | 0.0001580 | 0.407 | 0.000232 | 1.743 |
| Example 8 | 0.0000450 | 0.0001400 | 0.410 | 0.000245 | 1.305 |
| Example 9 | 0.0000171 | 0.0001220 | 0.411 | 0.000233 | 0.599 |
| Example 10 | 0.0000204 | 0.0001870 | 0.410 | 0.000224 | 2.558 |

The inventors have also determined that the following examples in TABLE 3 include values that do not result in an engine where stresses in the components are not reduced effectively (e.g., resulting in component durability issues) including designs that exhibited inferior stress conditions as compared to the inventive examples.

TABLE 3

| Example | SFA (m^2) | CHA (m^2) | Inner Band Radius (IBR) (m) | Loading Area (per vane) (LA)(m^2) | C |
|---|---|---|---|---|---|
| Example 1 | 0.0000301 | 0.000072 | 0.407 | 0.000239 | −1.023 |
| Example 2 | 0.0000430 | 0.000088 | 0.408 | 0.000212 | −0.452 |
| Example 3 | 0.0000299 | 0.000089 | 0.407 | 0.000213 | −0.412 |
| Example 4 | 0.0000457 | 0.000079 | 0.411 | 0.000238 | −0.825 |

TABLE 4 shows minimum and maximum values for total slot flow area (SFA), total cooling hole area (CHA), inner band radius (IBR), and loading area (LA) of an engine defined by (C) in Expression (4) above.

TABLE 4

| | Min | Max |
|---|---|---|
| SFA (m^2) | 0.0000160 | 0.0000581 |
| CHA (m^2) | 0.0001060 | 0.0001940 |
| IBR (m) | 0.4060000 | 0.411000 |
| LA (m^2) | 0.0002090 | 0.000256 |
| C (dimensionless) | 0.112 | 7.409 |

Additional benefits associated with the second stage turbine nozzle 102 with the geometries of the slots 200 in the trailing edge 172 of a vane airfoil 160, in combination with the geometries of the cooling holes 240 of a baffle insert 220, as described herein. For instance, the turbine nozzle described herein enables the development and production of high-performance turbine engines and nozzles across multiple performance metrics within a given set of constraints.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A nozzle segment is designed for use in a turbine engine having an engine core including a combustor for generating hot combustion gases. The nozzle segment includes a loading area surface configured to engage an adjacent nozzle segment. The loading area surface defines a loading area (LA) between 0.000209 m² and 0.000256 m², inclusive of endpoints. The nozzle segment also includes an inner band segment configured to be oriented in an upstream direction of the engine core and having an inner band radius (IBR) defined by an arc along the inner band segment, the IBR between 0.406 m and 0.411 m, inclusive of endpoints. The nozzle segment also includes one or more vanes. Individual ones of the one or more vanes include an airfoil including an outer surface defining a leading edge, a trailing edge, a suction side, and a pressure side. The airfoil further includes slots extending along the trailing edge in a generally radial direction with the slots defining a total slot flow area (SFA) between 0.0000160 m² and 0.0000581 m², inclusive of endpoints. Individual ones of the one or more vanes also include a baffle insert extending within an internal cavity defined by the outer surface. The baffle insert includes baffle walls and cooling holes formed in the baffle walls with the cooling holes defining a total cooling hole area (CHA) between 0.0001060 m² and 0.0001940 m², inclusive of endpoints. The design falls within the following parameter relationship:

$$0.112 \leq 13 * \left( \frac{CHA(m^2) - 0.000103 \ m^2}{0.000103 \ m^2} \right)$$

$$\left( \frac{SPA(m^2) + 0.00004 \ m^2}{0.00004 \ m^2} \right) \left( \frac{IBR}{0.4} \right) \left( \frac{LA(m^2)}{0.001 \ m^2} \right) \leq 7.409.$$

The slots can include a first slot having a first geometry and a second slot having a second geometry different than the first slot. The slots for any of the configurations can include generally racetrack-shaped slots or other configurations. For example, the slots can include at least one slot having a circular geometry and/or at least one slot having a rectangular geometry. The cooling holes can a circular geometry. In another configuration, individual ones of the cooling holes have different geometries.

What is claimed is:

1. A nozzle segment for use in a turbine engine having an engine core including a combustor for generating hot combustion gases, the nozzle segment comprising:
   a loading area surface configured to engage an adjacent nozzle segment, wherein the loading area surface defines a loading area (LA) between 0.000209 m² and 0.000256 m², inclusive of endpoints;
   an inner band segment configured to be oriented in an upstream direction of the engine core and having an inner band radius (IBR) defined by an arc along the inner band segment, the IBR between 0.406 m and 0.411 m, inclusive of endpoints; and
   one or more vanes that extend circumferentially, individual vanes of the one or more vanes including:
      an airfoil including, an outer surface defining a leading edge, a trailing edge, a suction side, and a pressure side, the airfoil further including slots extending along the trailing edge in a generally radial direction, the slots defining a total slot flow area (SFA) between 0.0000160 m² and 0.0000581 m², inclusive of endpoints, and
      a baffle insert extending within an internal cavity defined by the outer surface, the baffle insert including baffle walls and cooling holes formed in the baffle walls, the cooling holes defining a total cooling hole area (CHA) between 0.0001060 m² and 0.0001940 m², inclusive of endpoints;

wherein:

$$0.112 \leq 13 * \left( \frac{CHA(m^2) - 0.000103 \ m^2}{0.000103 \ m^2} \right)$$

$$\left( \frac{SPA(m^2) + 0.00004 \ m^2}{0.00004 \ m^2} \right) \left( \frac{IBR}{0.4} \right) \left( \frac{LA(m^2)}{0.001 \ m^2} \right) \leq 7.409.$$

2. The nozzle segment of claim 1 wherein the slots include a first slot having a first geometry and a second slot having a second geometry different than the first slot.

3. The nozzle segment of claim 1 wherein the slots include generally racetrack-shaped slots.

4. The nozzle segment of claim 1 wherein the slots include at least one slot having a circular geometry.

5. The nozzle segment of claim 1 wherein the slots include at least one slot having a rectangular geometry.

6. The nozzle segment of claim 1 wherein the cooling holes have a circular geometry.

7. The nozzle segment of claim 1 wherein individual ones of the cooling holes have different geometries.

* * * * *